Dec. 21, 1926.  
F. DAVID ET AL  
1,611,340  
AUTOMATIC SIGNALING DEVICE  
Filed August 28, 1924

Inventor  
*Frederick David,*  
and *Carl Muth.*

By *William C. Linton.*  
Attorney

Patented Dec. 21, 1926.

1,611,340

UNITED STATES PATENT OFFICE.

FREDERICK DAVID AND CARL MUTH, OF NEW YORK, N. Y., ASSIGNORS TO CITIZEN PROTECTIVE SPEED CONTROLLER CO. INC., OF NEW YORK, N. Y., A CORPORATION OF NEW YORK.

AUTOMATIC SIGNALING DEVICE.

Application filed August 28, 1924. Serial No. 734,721.

This invention relates to improvements in automatic signaling devices, having for an object to provide a novel form of speed responsive signaling device especially adaptable for use upon motor driven vehicles whereby an effectual alarm will be given to the vehicle operator when the speed of an equipped vehicle exceeds the limits fixed by law, in order that the same may be appropriately diminished.

It is likewise an object of the invention to provide the signaling device with a speed actuated circuit closing means, the same, at a certain predetermined point of its operation, functioning to close one of the electrical signaling circuits whereby to apprise or warn the operator of the speed at which the equipped vehicle is travelling, at a second predetermined point of operation, to actuate a second alarm circuit including said audible signal, and a visual signaling means for indicating the particular electrical signaling circuit energized.

Another and equally important object of the invention is to provide the speed actuated circuit closing means with adjustable contact posts which with relative adjustment, may be caused to be engaged by their respective contact arms under influence of the speed controlled mechanism of the circuit closing means, to individually and selectively operate the signaling devices connected thereto.

Other objects of the invention will be in part obvious, and in part pointed out hereinafter.

In order that the invention and its mode of operation may be readily understood by persons skilled in the art, we have in the accompanying illustrative drawings, and in the detailed following description based thereupon, set out one possible embodiment of the same.

In these drawings:—

Figure 1:
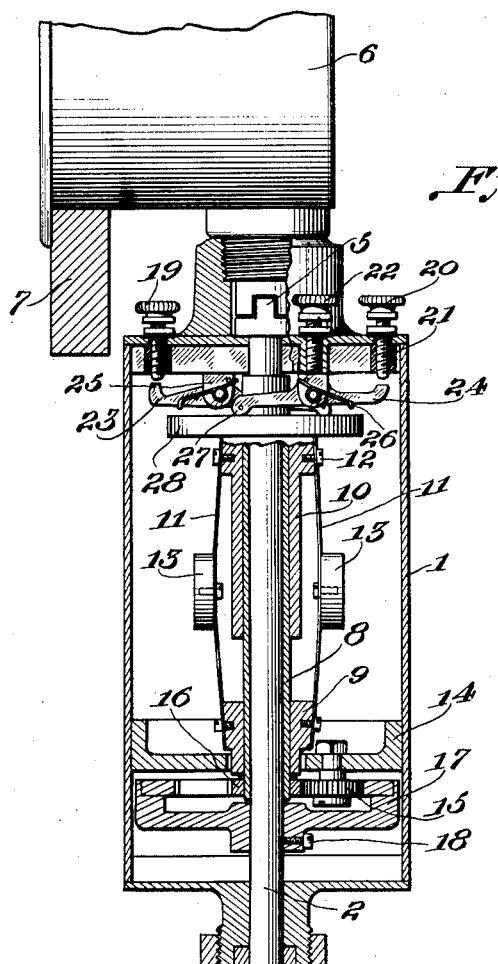
Figure 2:
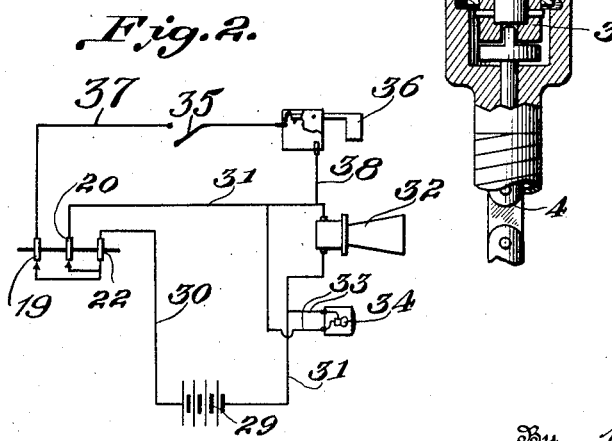

Figure 1 is a vertical section through the speed actuated circuit closing means of our invention; and, Figure 2 is a schematic view showing the arrangement of the electrical circuits included by the speed actuated circuit closing means.

Having more particular reference to the drawings, in connection with which like characters of reference will designate corresponding parts throughout, the invention may be stated to comprise a speed actuated circuit closing means adapted to be housed in a suitable casing generally indicated herein by the numeral 1, said casing having a shaft 2 passing longitudinally through the same and journalled in suitable bearings therein and at the opposite ends of such casing. One end of this shaft 2 is adapted to be connected through a suitable coupling device 3 to a flexible shaft 4 connected to and operable from a portion of a motor driven vehicle equipped with the invention, while the opposite end of said shaft is coupled as generally indicated by the numeral 5 to a speed responsive device or speedometer 6 mounted directly above the same, as clearly shown in the Figure 1, and arranged upon the usual instrument carrying board or panel 7 of the equipped motor driven vehicle.

Loosely mounted upon the intermediate portion of the shaft 2, that is, that portion of said shaft within the casing 1 is a hollow shaft 8 having a collar 9 fixedly secured to the lower portion thereof, while a sleeve 10 is slidably mounted upon the upper portion of the same. Spring speed governor arms 11 are secured at their opposite extremities to adjacent portions of the collar 9 and the sleeve 10, as indicated by the numeral 12, and are provided, upon their intermediate portions, with the usual weighted devices 13. Thus, it will be understood that with rotation of the hollow shaft 8 upon the shaft 2, the centrifugal force thereof will be such as to cause outward relative movement of the weighted devices 13 with the resultant flexing of the spring arms 11, hence moving the sleeve 10 along the hollow shaft 8.

With a view towards providing means for transmitting rotary motion to the hollow shaft 8, a circular bracket 14 is arranged within the casing 1 and fixedly secured to portions of the side walls thereof in proximity to the lower end of the same. An idler gear 15 is mounted upon this bracket 14 and is adapted to mesh with a pinion 16 fixedly mounted upon the lower hub portion of the collar 9, and with the teeth of an internal gear 17 fixedly connected to the lower portion of said shaft 2 within the casing 1 through the medium of a locking screw or other similar fastening device 18. Thus, with rotation of the shaft 2, it will be understood that the internal gear 17 will be rotated therewith and in consequence, rotary motion will be transmitted therefrom through the idler gear 15 to the pinion 16 fixedly mounted upon the lower end or hub portion of the collar 9 which in turn is fixedly mounted upon the adjacent extremity of the hollow shaft 8 loosely or rotatably mounted upon the shaft 2.

Contact screws 19 and 20 are mounted upon the upper end of the casing 1 and are insulated therefrom as indicated by the numeral 21, such contact screws 19 and 20 being adjustable with respect to those portions of the casing receiving the same and having their inner ends arranged or extended within such casing 1, as clearly indicated in the Figure 1. Another contact screw 22 is supported upon the upper end of the casing 1, and is adapted to be electrically connected through the cover of the casing 1 to the contact arms 23 and 24 pivotally mounted in suitable bearings 25 secured to the under side of the upper end of the casing 1, such contact arms 23 and 24 being normally influenced through the medium of springs 26 arranged adjacent their pivot points whereby to be caused to move in directions to effect contact with the adjustable contact posts 19 and 20. Those ends of the contact arms 23 and 24 opposite to the portions of the same which contact with their respective contact screws or posts 19 and 20 are formed with curved or rounded bearing surfaces, such as indicated by the numeral 27, and these particular ends of the contact arms are adapted to have bearing upon the plane upper surface of a disc-like head 28 fixedly carried upon the upper or adjacent end of the sleeve 10. Thus, it will be seen that with arrangement of the disc-like head 28 in its uppermost position, upward thrust will be imparted to the portions 27 of the contact arms 23 and 24 and therefore, the opposite ends of the same will be caused to be disengaged from their respective contact posts or screws 19 and 20.

The speed actuated circuit closing means of our invention is adapted to be provided with a suitable source of electrical energy herein designated by the numeral 29, one pole of such source being connected through a suitable conductor 30 to the contact 22, while a conductor 31 extends from the opposite side or pole of said source of energy 29 and passes through a suitable audible signaling device 32 from whence it is extended into electrical contact with the contact posts 19 and 20. Shunt conductors 33 are tapped onto the conductor 31 and are connected to an incandescent electric lamp 34 supported upon a portion of the vehicle whereat the same may be readily seen or observed by its operator.

An electrically actuated visual signal or flag 36 is also provided, and is adapted to be electrically connected through the medium of an electrical conductor 37 to the contact post 19, while the opposite side or contact thereof is connected through the medium of an electrical conductor 38 to the conductor 31 extending from the audible electrically operated signal 32. In this connection, it is to be noted that the visual signaling device 36 is to be arranged at a point whereat the same is to be readily and conveniently observed by the vehicle operator or by persons without the vehicle, and if desired, the same may be arranged in proximity to the electric incandescent lamp 34 whereby, with illumination of said lamp, the same may be readily observed in darkness. Interposed in the conductor 37 is a manually operable switch 35 whereby the circuit including the visual signaling device 36 may be opened and closed for the purpose to be later set forth.

The modus operandi of the invention may be stated to be as follows:

The contact posts 19 and 20 are first adjusted to positions whereat the same will be engaged at predetermined points or periods by their respective contact arms 23 and 24. Assuming that the posts 19 and 20 have been so adjusted, rotary motion is directed from the flexible shaft 4 to the shaft 2 rotatably mounted within the casing 1 of the speed actuated circuit closing means, causing rotation of the hollow shaft 8 upon the same through the medium of the gearing identified herein by the numerals 15, 16 and 17. As the speed of the vehicle increases, so will the velocity of rotation of the shaft 2 increase, and therefore, the hollow shaft 8 rotatably mounted upon the latter. Consequent upon this, centrifugal force will be such as to effect spreading or outward movement of the weighted devices 13 upon the spring arms 11, which, as hereinbefore stated, have their upper ends connected, as indicated at 12, to a portion of the sleeve 10 slidably and rotatably arranged upon the hollow shaft 8. Accordingly, with spreading or outward movement of the weighted devices 13 by reason of the centrifugal force imparted thereto, the circular or disc-like head 28 will be drawn downwardly, whereupon the springs 26 engaging the contact arms 23 and 24 will cause these contacts 23 and 24 to be moved in directions towards their respective contact posts 19 and 20. With continued movement of the contact arms 23 and 24, the free end of the contact arm 23 will be the first to engage with the adjacent end of the previously adjusted contact post 19, thereby closing an electrical circuit through the visual and audible signaling devices 32, 34 and 36 provided the switch 35 is closed, by way of the conductors 37, 38 and 31, the latter being supplied with current from the battery 29. The ground wire 30 is electrically connected to the contact posts 19 and 20 through the casing 1 and post 22. Thus, the audible signal device 32 will be operated and will serve to draw the attention of the vehicle operator to the speed at which the vehicle is travelling, in order, if necessary, that the same may be appropriately decreased. When a vehicle equipped with the improved device is traveling in open country wherein a greater maximum speed limit exists, the operator then moves the switch 35 to its open position whereby to prevent operation of the visual signal 36; it being borne in mind that this visual signal 36 functions to indicate excessive speed when the equipped vehicle is traveling within a congested area or the city. Upon opening of the switch 35 and with rotation of the shaft 2 at an increased rate of speed, the spreading of the weighted devices will be even more pronounced, due to the increase of centrifugal force applied thereto and accordingly, further downward movement of the circular head 28 upon the shaft 2 will be effected, thus permitting the free end of the remaining contact arm 24 to engage with its respective contact post 20, thereby closing an electrical circuit through the signal devices 32 and 34 and hence, apprising the vehicle operator of the fact that the maximum "open country" speed of the vehicle has been reached.

In using the improved device constituting our invention, the same may be advantageously employed to indicate several speed limits, as for example, the speed limits within certain city limits as prescribed by law, and second, the speed limits in open country, as prescribed by law. In this connection, it is appreciated that the speed limits within a city are lower than those of open country and accordingly, when a vehicle equipped with the invention is travelling within city limits, the vehicle operator will be apprised upon exceeding of such city speed limits by operation of the audible signal, brought about by closing of an electrical circuit through the contact arms 23 and the contact post 19. When a vehicle is travelling within the city limits, the switch 35 should be closed, but when travelling at a greater rate of speed or within open country limits, this switch 35 must be opened. The visual signal 36 is to indicate as to whether this switch 35 is opened or closed so as to announce as to whether the city or open country limits circuit is completed. This visual signal 36 may be a part of the switch 35, such as a flag or other insignia attached to the handle of the switch, indicating its position. Should the speed of open country limits be exceeded when an automobile equipped with the invention is travelling through such territory, its operator will be apprised of such fact with actuation of the audible signal 32, brought about by engagement of the contact arm 24 with its respective contact post 20.

Manifestly, the construction shown is capable of considerable modification, and such modification as is within the scope of our claim, we consider within the spirit of our invention.

We claim:—

In an electrical circuit closer having a plurality of independently adjustable electrical contact posts thereon and a corresponding number of pivotally mounted spring pressed arms certain of the ends of which are engageable with said contact posts, an operating means for said pivotal arms comprising a shaft journaled in bearings at its opposite ends in said circuit closer, a hollow shaft received upon a portion of said first shaft, a sleeve mounted upon the upper portion of the hollow shaft and slidable longitudinally thereof, a disc-like head carried on said sleeve, centrifugally actuated arms secured at their upper ends to the slidable sleeve and having their lower ends fixedly connected to the hollow shaft, an internal gear fixedly mounted upon the lower portion of said first shaft, a pinion fixedly mounted upon the lower end of said hollow shaft, and gearing interconnecting said internal gear and said pinion whereby to transmit rotary motion from said first shaft to said hollow shaft.

In witness whereof we have hereunto set our hands.

FREDERICK DAVID.
CARL MUTH.